No. 838,498. PATENTED DEC. 11, 1906.
E. CLARK.
SHOVEL ATTACHMENT.
APPLICATION FILED APR. 27, 1906.
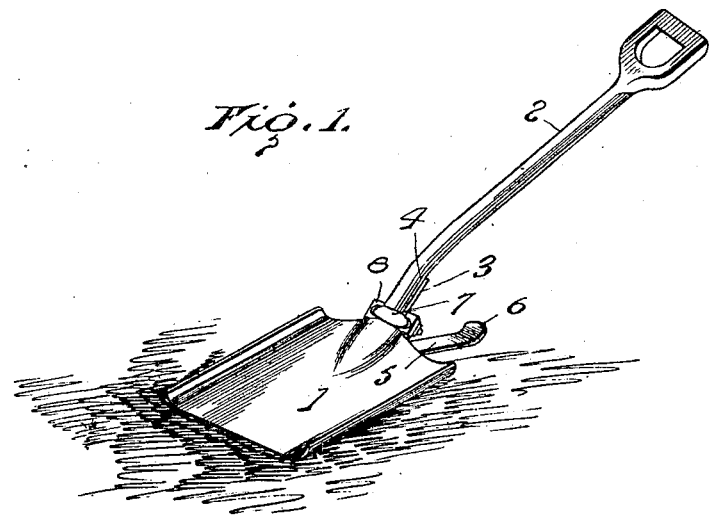
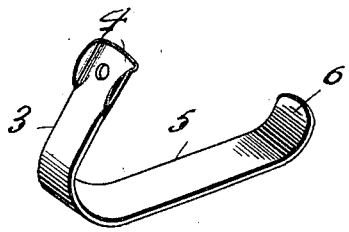
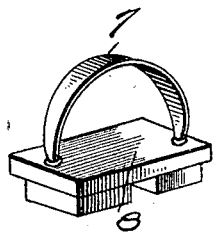
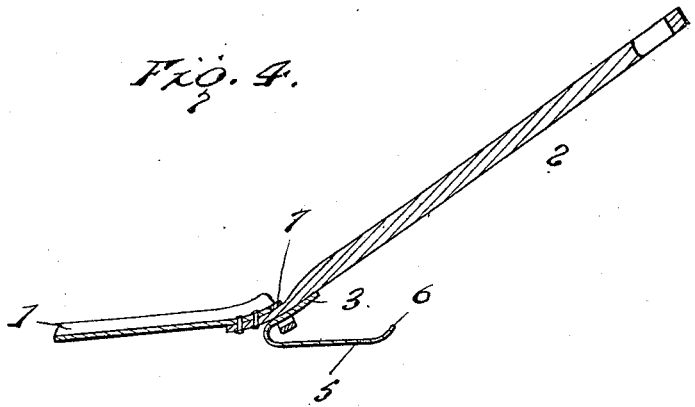
Inventor
E. Clark
Witnesses
By
R. & A. B. Lacey, Attorneys

UNITED STATES PATENT OFFICE.

ENOS CLARK, OF MIDLAND, INDIANA.

SHOVEL ATTACHMENT.

No. 838,498.  Specification of Letters Patent.  Patented Dec. 11, 1906.

Application filed April 27, 1906. Serial No. 314,082.

*To all whom it may concern:*

Be it known that I, ENOS CLARK, a citizen of the United States, residing at Midland, in the county of Greene and State of Indiana, have invented certain new and useful Improvements in Shovel Attachments, of which the following is a specification.

The present invention is in the nature of a fulcrum attachment for shovels, which is especially designed for the use of miners and which is so constructed as to have a spring action which facilitates the raising of the material being operated upon into a car or other elevated position.

The object of the invention is to provide a fulcrum attachment of this character which can be readily attached to any spade and which is exceptionally strong and durable in construction.

For a full description of the invention and the merits thereof and also to acquire a knowledge of the details of construction of the means for effecting the result reference is to be had to the following description, and accompanying drawings, in which—

Figure 1 is a perspective view of a shovel provided with the fulcrum attachment. Fig. 2 is an enlarged perspective view of the spring member constituting the attachment. Fig. 3 is a similar view of the clamp employed to secure the attachment to the shovel, and Fig. 4 is a longitudinal sectional view through the shovel.

Corresponding and like parts are referred to in the following description and indicated in all the views of the drawings by the same reference characters.

The invention is shown as applied to a shovel of the conventional type, in which the numeral 1 designates the blade, and 2 the handle. The attachment is in the form of a spring member which is preferably formed of flat material and which comprises two arms arranged at angles to each other. The shorter arm 3 fits against the lower portion of the handle 2 and is provided at its extremity with outwardly-extending flanges 4, which embrace the handle and enable a rigid joint to be formed between the two members. The opposite arm 5 extends rearwardly from the blade of the shovel and has its extremity bent upwardly, as seen at 6. This rearwardly-extending arm 5 normally bears against the surface of the ground and tends to hold the shovel in the desired position for pushing forward under the coal or similar material. The clamping member employed for connecting the shorter arm 3 of the attachment to the shovel is in the form of a U-bolt 7, which fits around the handle 2 at a point adjacent the blade 1 and coöperates with a bar 8, which bears against the short arm of the attachment and is provided with openings through which the two members of the U-bolt 7 are passed. With this construction it will be apparent that the spring member can be readily attached or removed from any of the types of shovels in common use.

In the operation of the device the shovel is pushed forward under the coal and the latter raised by bearing down upon the handle 2 in such a manner as to cause the longer arm 5 of the attachment to serve as a fulcrum. This has the result of compressing the spring member, and the upward force exerted by the spring is utilized in throwing the coal in the car or other receptacle. Owing to the fact that the attachment is formed of flat spring material, it is adapted to slide readily over the surface of the ground and forms a guideway for directing the movements of the blade. The upwardly-bent extremity of the long arm 5 prevents the end of the attachment from digging into the ground and also forms a shoe, which bears against the surface of the ground when the blade 1 is being lifted.

Having thus described the invention, what is claimed as new is—

1. The combination of a shovel or like implement comprising a blade and a handle, a fulcrum attachment comprising two arms arranged at angles to each other, one of the arms extending rearwardly from the blade and having a spring action, while the opposite arm fits against the handle and is provided toward one end with a pair of outwardly-extending flanges which embrace the same, and a clamping member spaced from the flanges and serving to secure the latter-mentioned arm to the handle.

2. The combination of a shovel comprising a blade and a handle, a fulcrum attachment comprising two arms formed of flat material and arranged at angles to each other, one of the spring-arms extending rearwardly from the blade and having its extremity bent upwardly, the said arm having a spring action, while the opposite spring-arm fits against the handle and is provided with flanges which embrace the same, and a U-bolt passing around the handle and coöperating with a bar which bears against the latter-mentioned arm of the attachment in order to hold the same rigidly in position.

In testimony whereof I affix my signature in presence of two witnesses.

ENOS CLARK. [L. S.]

Witnesses:
 L. H. DIXON,
 GEO. GRIFFITH.